United States Patent [19] [11] 3,913,005
Cook [45] Oct. 14, 1975

[54] FREQUENCY MULTIPLIER CIRCUIT FOR CONTROLLING HARMONIC CURRENTS

[75] Inventor: Thomas H. Cook, Cherry Hill, N.J.

[73] Assignee: Inductotherm Corporation, Rancocas, N.J.

[22] Filed: Aug. 28, 1974

[21] Appl. No.: 501,398

[52] U.S. Cl. ............................ 321/68; 13/26; 321/7; 323/48
[51] Int. Cl.² .................... H05B 5/04; H02M 5/16
[58] Field of Search .......... 13/26; 219/10.75; 321/7, 321/68; 323/44 R, 48, 49

[56] References Cited
UNITED STATES PATENTS
3,259,828 7/1966 Biringer .................................. 321/7
3,264,549 8/1966 Biringer .................................. 321/68
3,295,050 12/1966 Rowan et al. ........................ 321/68

Primary Examiner—A. D. Pellinen
Attorney, Agent, or Firm—Seidel, Gonda & Goldhammer

[57] ABSTRACT

A circuit for controlling the harmonic currents in the secondary windings of saturable core transformers used to supply power to induction furnaces. Switching means are provided whereby the primary and tertiary windings of the saturable core transformers are selectively connected in Y—Y or in series Y. When connected in Y—Y, the core is saturated and significant harmonic currents are induced in the series connected secondaries. When connected in series Y, the cores are driven out of saturation and only negligible harmonic currents exist in the series connected secondaries.

6 Claims, 6 Drawing Figures

FREQUENCY MULTIPLIER CIRCUIT FOR CONTROLLING HARMONIC CURRENTS

BACKGROUND OF THE INVENTION

This invention relates to a circuit for controlling the harmonic currents present in the secondary coils of a plurality of saturable core transformers used to supply power to induction furnaces. More particularly, this invention relates to a frequency multiplier circuit for selectively driving the cores of saturable core transformers into and out of saturation so as to control the harmonic currents which are induced in the secondary windings thereof.

It is well known in the metal melting art that induction furnaces (coreless, channel, or otherwise) inherently stir the metal which they are heating. This stirring action is produced by the magnetic forces created by the heating currents induced in the metal. It is also well known that these stirring forces can be reduced by increasing the frequency of such currents since higher frequency currents produce less magnetic field penetration of the metal. Thus, by controlling the frequency of the currents supplied to the coils of an induction furnace, it is possible to control the stirring forces produced within such furnaces.

In the metal melting industry, the need exists for both single phase high frequency melting and polyphase fundamental frequency stirring. For example, in vacuum metal melting, it is desirable to alternately supply the coil of an induction furnace with single phase high frequency and polyphase low frequency currents so as to perform melting and stirring operations independently.

It is an object of this invention to provide a new and unobvious multiplier circuit for controlling the harmonic currents induced in the secondary windings of saturable core transformers which supply power to the coils of an induction furnace. By so controlling the harmonic currents, the multiplier circuit will control the melting and stirring modes of the furnace being supplied.

Prior art multiplier circuits are generally of two types: motor generator sets or static magnetic multipliers. Of the latter a saturable core transformer having a star connected primary and a series connected secondary are the most common. The static magnetic multiplier exploits the non-linear transfer characters of saturable magnetic cores to produce harmonic frequencies in the secondary windings of saturable core transformers. Thus, for example, triple and higher frequency currents can be derived from three phase line frequencies sources by properly connecting the windings on such saturable cores. These techniques are well known and need not be described in detail.

The herein disclosed invention utilizes this traditional star-series configuration to produce harmonic currents in the secondary windings of saturable core transformers. However, this invention provides a new and unobvious circuit for controlling the production of these harmonics.

Control of the harmonics induced in the secondary windings is attained through exploitation of the non-linear characteristics of saturable core transformers. Such transformers can be operated in a linear or non-linear range. When operated in the non-linear or saturation range, strong harmonic currents are induced in the transformer secondaries. When operating in the linear range, the current induced in the secondary windings is primarily an attenuated fundamental frequency current. Therefore, by controlling the operating range of the transformers it is possible to control the harmonic currents in their secondary windings and thereby control the stirring and heating operations of the furnace supplied by the secondary windings.

Prior art static multipliers depended upon extensive auxiliary equipment such as independent saturable core reactors to control the frequency of the current supplied to the furnace. An example of such a circuit is U.S. Pat. No. 3,536,983. Such auxiliary equipment adds greatly to the cost of the multiplier circuit. The herein disclosed invention controls the frequency of the current supplied to the furnace without the need for any such expensive supplementary equipment. specifically, the present invention provides a new circuit which is capable of driving the saturable core of the transformer into and out of saturation by the simple, but unobvious, expedient of rearranging the connection between the tertiary and primary windings through the use of high current switch gear. As such, this invention provides a means for controlling the harmonic currents in the secondary windings of a plurality of transformers without requiring costly supplemental equipment employed by the prior art devices.

Further advantages and benefits of the present invention will become apparent upon the reading of the description of the preferred embodiment of the invention taken in conjunction with the accompanying drawings.

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENTS

Figure 1:
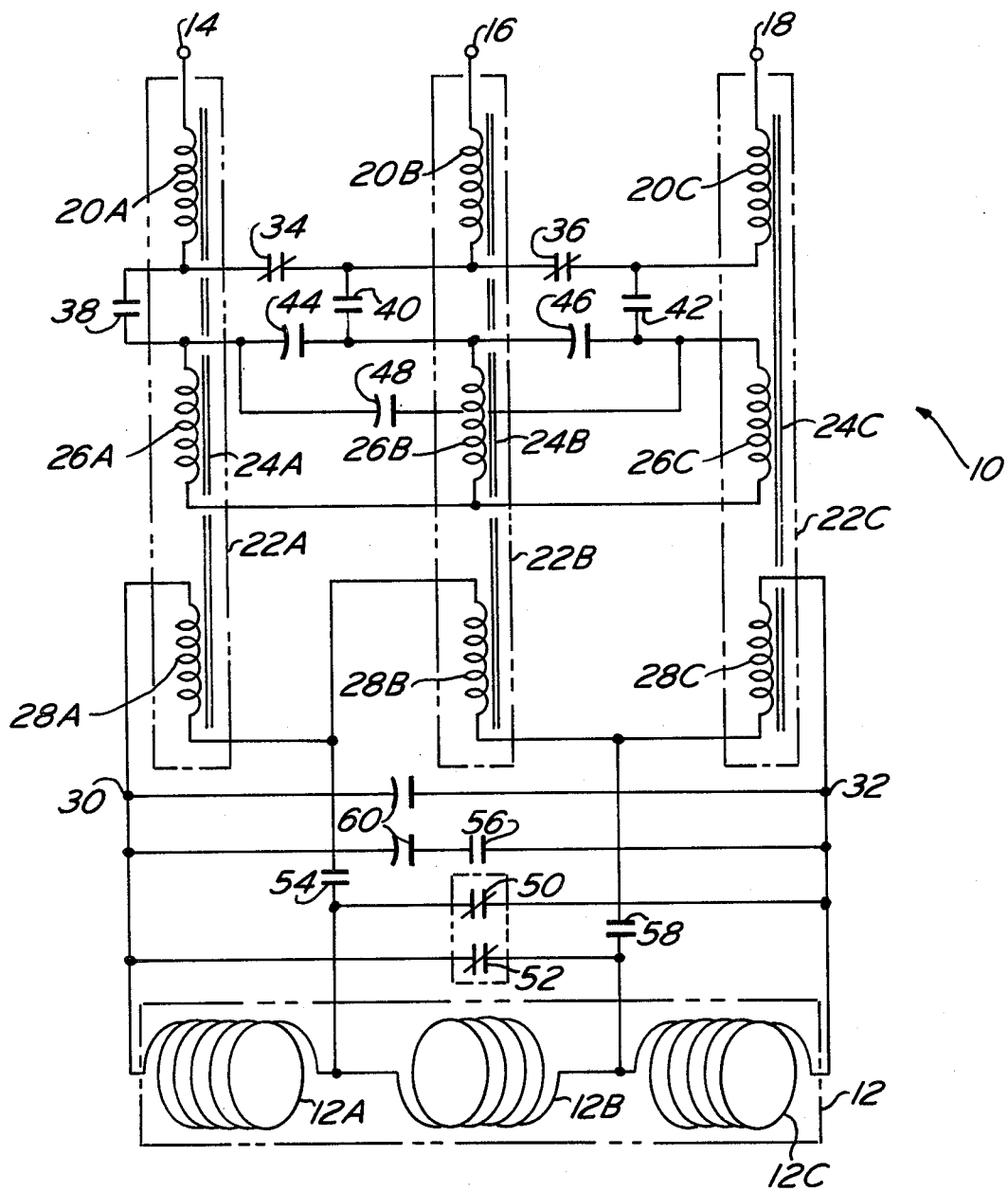
FIG. 1 is a schematic circuit diagram of the herein disclosed multiplier circuit.

For the purpose of illustrating the invention, there is shown in the drawings a form which is presently preferred; it being understood, however, that this invention is not limited to the precise arrangements and instrumentalities shown.

Referring now to the drawing, wherein like numerals indicate like elements, there is shown a multiplier circuit in accordance with the herein disclosed invention designated generally as 10. In accordance with the present description, the induction furnace 12 is connected to a three phase source by multiplier circuit 10.

Power is supplied to the multiplier circuit at input line terminals 14, 16 and 18. Input line terminal 14 is connected to the primary winding 20A of saturable core transformer 22A. Saturable core transformer 22A has saturable core 24A upon which primary winding 20A, tertiary winding 26A and secondary winding 28A are wound. Saturable core 24A is preferably a toroidal core formed as described in U.S. Pat. No. 3,295,050. These toroidal cores are designed to provide a sharp knee in the saturation curve while at the same time avoiding instability and the creation of harmonics in the transformer primary circuit. The flux density at which the transformers are designed to optimize third harmonic currents may be, for purposes of illustration $150 \times 10^3$ lines per square inch of core cross-section. If commercially available line frequency transformers were used, flux density would be about $100 \times 10^3$ lines per square inch.

Saturable core transformers 22B and 22C are similarly constructed. Specifically, saturable core transformer 22B is comprised of saturable core 24B upon which is wound primary winding 20B, tertiary winding 26B and secondary winding 28B. Saturable core transformer 22C is comprised of saturable core 24C upon which is wound primary winding 20C, tertiary winding 26C and secondary winding 28C.

Figure 2A:
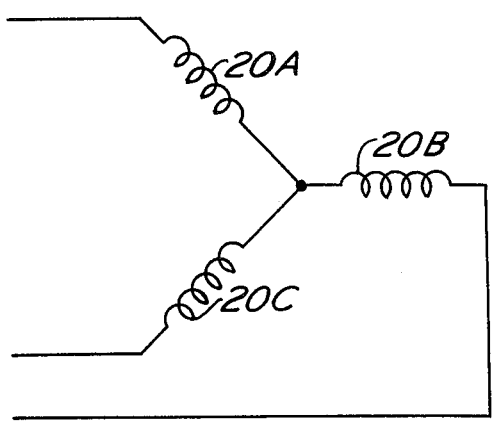
FIG. 2a shows the configuration of the primary windings of FIG. 1 when the multiplier circuit is switched into the high frequency melting mode of operation.
Figure 2B:
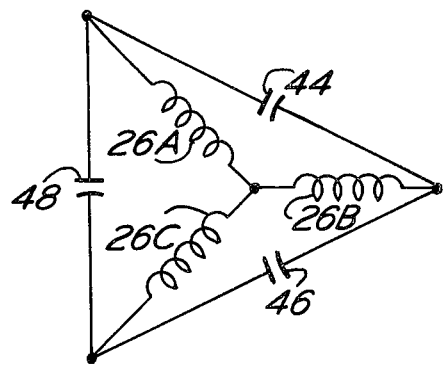
FIG. 2b shows the configuration of the tertiary windings of FIG. 1 when the multiplier circuit is switched into the high frequency melting mode of operation.

Secondary windings 28A, 28B and 28C are connected in series with open terminals 30 and 32 across which the furnace 12 may be connected. Furnace 12 may, for example, include coils 12A, 12B and 12C. The top and bottom coils are identical. The center coil is reverse wound and includes approximately 80% of the turns. The existence or non-existence of such harmonics in these windings is controlled by the operating range of saturable core transformers 22A, 22B and 22C. In the melting mode of operation, normally closed switches 34 and 36 are closed, and normally open switches 38, 40 and 42 are open. During this mode of operation, the primary windings 20A, 20B and 20C are arranged as shown in FIG. 2a, and tertiary windings 26A, 26B and 26C are arranged as shown in FIG. 2b. Primary windings 20A, 20B and 20C are star or Y connected as are tertiary windings 26A, 26B and 26C. In this configuration the ampere-turns (NI) force the saturable core transformers 22A, 22B and 22C into saturation.

During this mode of operation, the primary and secondary windings are in the traditional Y-series configuration. Since the saturable cores 22 A, 22B and 22C are in saturation, strong harmonics, principally the third harmonic, will appear in secondary windings 28A, 28B and 28C. Hence the frequency has been multiplied. The Y-connected tertiary windings 26A, 26B; and 26C are shunted by capacitors 44, 46 and 48 and serve as a short circuit for generated harmonic currents except for those which are odd multiples of three. In the preferred embodiment, the turns ratio of the primary to tertiary windings is 2 to 1.

Figure 2C:
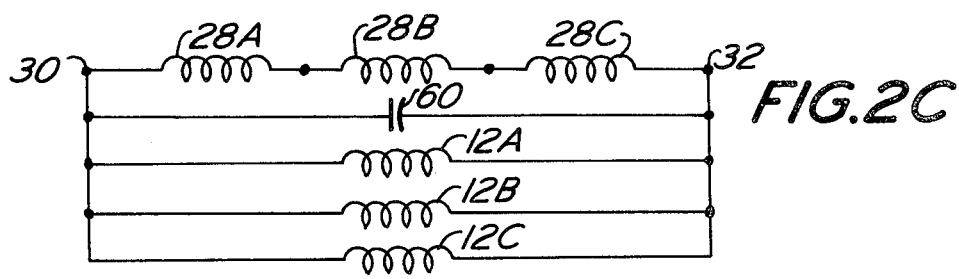
FIG. 2c shows the configuration of the secondary windings and load windings of FIG. 1 when the multiplier circuit is switched into the high frequency melting mode of operation.

During the melting mode of operation, normally closed switches 50 and 52, which are mechanically connected, are in the closed position. Normally open switches 54 and 58 are in the open position. The configuration of secondary windings 28A, 28B and 28C as well as furnace coils 12A, 12B and 12C are shown in FIG. 2c. As noted above, the primary and tertiary windings of multiplier circuit 10 will be in the traditional Y-series configuration during this mode. As a result of the saturation of saturable core 24A, the induced current in secondary winding 28A will contain both fundamental and odd harmonic components. The same will be true of secondary windings 28B and 28C. Additionally, the fundamental currents induced in each secondary winding will be 120° out of phase with the others and, therefore, will add to zero when the secondary windings are series connected across the furnace 12 as shown in FIG. 2c. However, the third harmonic currents in secondary windings 28A, 28B and 28C will be in phase and thus add to supply strong third harmonic current to the furnace 12.

As can best be seen in FIG. 2c, capacitor 60 shunts the parallel connected furnace coils 12A, 12B and 12C. During operation, these coils are maintained at the necessary power factor by adding or subtracting capacitance through switch 56.

Figure 3A:
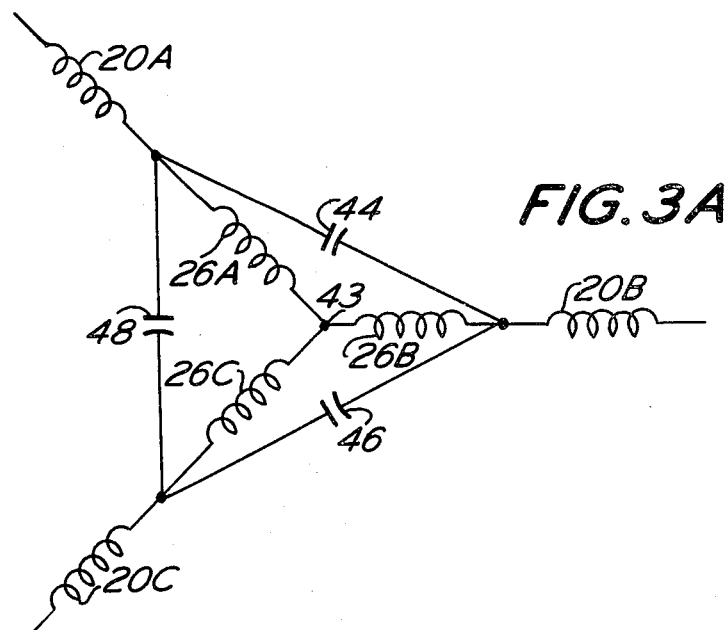
FIG. 3a shows the configuration of both the tertiary and primary windings of FIG. 1 when the multiplier circuit is switched into the primary frequency stir mode of operation.

During the stirring mode of operation, normally closed switches 34 and 36 are opened and normally open switches 38, 40 and 42 are closed. The resultant series Y configuration of primary and tertiary windings is shown in FIG. 3a. Primary winding 20A is in series with tertiary winding 26A, primary winding 20B is in series with tertiary winding 26B, and primary winding 20C is in series with tertiary winding 26C. The open nodes of each tertiary winding 26A, 26B and 26 are star connected at node 43. Capacitors 44, 46, and 48 now function as power factor correction capacitors connected at the one third tap of each series connected winding. Additional primary capacitors may be switched in at this point to further correct the line to a specific level.

This series Y connection reduces the volts per turn applied to saturable core transformers 22A, 22B and 22C. As such, the flux density in each saturable core 24A, 24B and 24C is significantly reduced, thus the cores are not driven into saturation. For example, if the flux density of the coils in the melting or Y—Y connected arrangement was a $150 \times 10^3$ lines per square inch, the flux density in the series Y connection might be $100 \times 10^3$ lines per square inch.

Figure 3B:
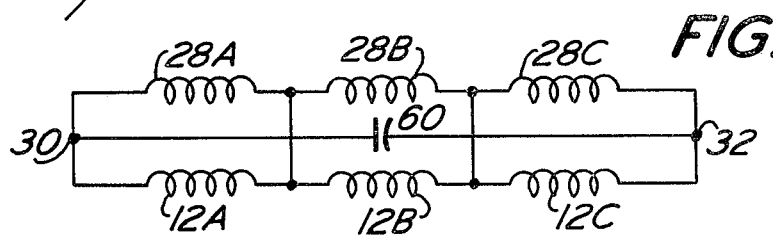
FIG. 3b shows the configuration of the secondary windings and load windings of FIG. 1 when the multiplier circuit is switched into the primary frequency stirring mode of operation.

Since the saturable core transformers 22A, 22B and 22C are operating in the linear range, the only significant currents induced in secondary winding 28A, 28B and 28C will be attenuated primary frequency currents. These currents will be 120° out of phase with each other, and therefore if the furnace coils 12A, 12B and 12C were connected as shown in FIG. 2c, the currents in secondary windings 28A, 28B and 28C would cancel and no power would be supplied to the furnace 12. For this reason, it is necessary to alter the connections between the secondary windings 28A, 28B and 28C and the furnace coils 12A, 12B and 12C. This is done by opening normally closed switches 50 and 52 and closing normally open switches 54 and 58. As can best be seen in FIG. 3b, the resultant connections place secondary winding 28A in parallel with furnace winding 12A, secondary winding 28B in parallel with furnace winding 12B, and secondary winding 28C in parallel with furnace winding 12C. In this way, the fundamental or line frequency developed in each of the secondary windings is applied to that portion of furnace 12 to which it is connected. Power factor connecting capacitor 60 remains connected across the outer nodes of the secondary windings 28A, 28B and 28C.

It should be obvious to those skilled in the art that the present invention may be embodied in other specific forms without departing from the spirit or essential attributes thereof and, accordingly, reference should be made to the appended claims, rather than the foregoing specification as indicating the scope of the invention.

What is claimed:

1. A multiplier circuit for controlling the harmonic currents present in the secondary coils of a plurality of saturable core transformers, comprising:

a plurality of transformers having saturable cores, each of said transformers being adapted to be coupled to a different phase of a multiphase power source and including a primary winding, a secondary winding and a tertiary winding;

said secondary windings being electrically connected in series;

means for alternately connecting said tertiary and primary windings in a first and a second circuit configuration, said first circuit configuration being such that said saturable cores are in saturation whereby significant harmonic currents are produced in said secondary windings, said second configuration being such that said saturable cores are driven out of saturation whereby negligible harmonic currents are produced in said secondary windings.

2. A circuit as specified in claim 1, wherein said first circuit configuration comprises a star electrical connection between said primary windings.

3. A circuit as specified in claim 1, wherein said first circuit configuration comprises a star electrical connection between said primary windings and a star electrical connection between said tertiary windings.

4. A circuit as specified in claim 1, wherein said second circuit configuration comprises a series electrical connection between the primary winding and the tertiary winding of each said transformer and a star electrical connection between the open nodes of each said tertiary winding.

5. A circuit as specified in claim 1, wherein said first circuit configuration comprises a star electrical connection between said primary windings, and said second circuit configuration comprises a series electrical connection between the primary winding and the tertiary winding of each said transformer and a star electrical connection between the open nodes of each said tertiary winding.

6. A multiplier circuit for controlling the stirring and melting operations of an induction furnace, comprising:

a plurality of transformers having saturable cores, each of said transformers being adapted to be coupled to a different phase of a multiphase source and including a primary winding, a secondary winding and a tertiary winding:

said secondary windings being electrically connected in series;

means for alternately connecting said tertiary and primary windings in a first and second circuit configuration, said first circuit configuration comprising a star electrical connection between said primary windings and said second circuit configuration comprises a series electrical connection between said primary and tertiary winding of each transformer, and a star electrical connection between the open nodes of each said tertiary winding;

said secondary windings being electrically connected to an induction furnace.

* * * * *